Patented Jan. 16, 1951

2,538,727

UNITED STATES PATENT OFFICE 2,538,727

COMPOSITION FOR CONTROL OF MITE AND INSECT PESTS

Eugene E. Kenaga, Midland, Mich., assignor to The Dow Chemical Company, Midland, Mich., a corporation of Delaware No Drawing. Application August 4, 1949, Serial No. 108,652

4 Claims. (Cl. 167—30)

This invention relates to parasiticides and is particularly concerned with a composition including as active toxicants tetraethyl pyrophosphate and 4'-chlorophenyl 4-chlorobenzene sulfonate.

Tetraethyl pyrophosphate is a water-white mobile liquid having a density of 1.181 at 25° C. and a refractive index $n_D$ of 1.4170 at 25° C. This compound is soluble in water, ethyl alcohol, acetone, xylene, carbon tetrachloride, and benzene, and insoluble in aliphatic hydrocarbon solvents such as kerosene and petroleum ether. It has recently come into wide usage as an agricultural insecticidal toxicant for the control of mites, aphids and other insect pests, altho at the concentrations and dosages required, the compound is very toxic to man and warm blooded animals.

It has been discovered that the 4-chlorophenyl ester of 4-chlorobenzene sulfonic acid may be combined with tetraethyl pyrophosphate to obtain a parasiticide composition having very desirable properties for the control of plant parasites. In such mixture the toxicants appear to be mutually activating so that a greater than additive or synergistic result is accomplished, particularly as regards mite and spider mite control. The mixture of toxicants permits the utilization of reduced amounts of tetraethyl pyrophosphate and of 4'-chlorophenyl 4-chlorobenzene sulfonate and the achievement of results superior to those obtainable with either material alone. A further advantage resides in the prolonged residual effect exerted by the mixture against mite and spider mite organisms. Thus a single application of the mixture, compounded with a suitable carrier, gives excellent control of such organisms as *Paratetranychus pilosus* (European red mite), *Tetranychus bimalculatus* (two-spotted spider mite), and *Bryobia praetiosa* (clover mite) for periods ranging up to several months. The potential value of the mixture would appear particularly for the treatment of orchard crops such as apples, pears, peaches, prunes, and plums, and ornamentals such as roses and evergreens.

The new toxicant mixtures may be employed with an inert material as a carrier, e. g. a finely divided solid, water, a solvent liquid of organic origin, a wetting and dispersing agent, an aqueous emulsion, or any suitable combination of any of these. In such formulations the mixture of toxicants may be present (1) in relatively high proportion to provide a concentrate adapted for further dilution to produce spray or dust compositions, or (2) in very low proportion to provide compositions suitable for application without further modification. Care should be exercised in the preparation of concentrates that the phosphate constituent be stable therein on storage.

In the preparation of sprays, the tetraethyl pyrophosphate and 4'-chlorophenyl 4-chlorobenzene sulfonate may be separately dispersed in the water or other liquid carrier. Alternatively, the toxicants may be mixed one with the other and the resulting mixture dispersed in the carrier. A further mode of operation includes grinding and mixing the toxicants with bentonite, diatomaceous earth, or talc, and dispersing the resulting mixture in water. Any compatible wetting or dispersing agent may be employed in the spray formulations.

In the preparation of dusts, the tetraethyl pyrophosphate and 4'-chlorophenyl 4-chlorobenzene sulfonate may be mixed with the finely divided carrier in any suitable manner. Operable carriers include volcanic ash, diatomaceous earth, some clays, wood flour, pyrophyllite and the like.

Where a concentrate is desired, the toxicants may be dispersed with wetting and dispersing agents to obtain products adapted to be dispersed in water or other aqueous spray composition. Alternatively, the toxicants may be separately compounded in concentrate form and mixed together upon dilution in the spray tank or otherwise. In another mode of operation, the mixture of toxicants may be dispersed in a finely divided solid carrier to produce a concentrate adapted subsequently to be diluted with additional carrier to form dusts.

Parasiticide compositions comprising the mixture of toxicants are applied to living vegetation in amounts sufficient to give a relatively uniform coverage of all plant surfaces. Because of the instability of the tetraethyl pyrophosphate, aqueous spray mixtures containing the toxicants should be applied as soon as possible following preparation, and the use of strongly alkaline wetting and dispersing agents should be avoided.

Wetting and dispersing agents adapted to be employed in the various compositions as suggested above include alkyl aryl sulfonate (Nacconol NR), dioctyl sodium sulfosuccinate (Aerosol OT), polyoxyethylene sorbitol oleate-laurate (Atlox 1045A), dimeric alkylated aryl polyether alcohol (Triton X155), alkylated aryl polyether alcohol (Triton X100), and the polyoxyethylene derivative of sorbitan trioleate (Tween 85). Other conventional additaments may be employed provided only that such agent accomplish the end desired and not be reactive with the other ingredients of the composition so as to reduce their effectiveness.

In operating in accordance with the present invention, any suitable amount of tetraethyl pyrophosphate may be employed in combination with 4'-chlorophenyl 4-chlorobenzene sulfonate to obtain compositions in which the toxicants are mutually activating. The exact amounts of the toxicants in the mixture do not appear to be critical. The preferred proportions are dependent upon the type of composition in which the mixture of toxicants is applied, the organism concerned, the degree of infestation of the plants to be treated, and the period for which the residual action and control is desired. Ordinarily, from about 0.3 to 20 parts by weight of tetraethyl pyrophosphate is employed with each 10 parts of 4'-chlorophenyl 4 - chlorobenzene sulfonate. In spray compositions, the proportions of the toxicants and dosages applied should be so integrated that the content of tetraethyl pyrophosphate is at least 0.03 pound and the content of 4'-chlorophenyl 4-chlorobenzene sulfonate is at least 0.1 pound per 100 gallons. The exact amounts employed are determined by the organism to be controlled and the tolerance of the host plant for the toxicant mixture. In dusts, good results are obtained with compositions containing from 1 to 10 per cent by weight of the mixture of toxicants. With either sprays or dusts, a uniform and thorough coverage of all plant surfaces is desirable. In concentrates, the mixture of toxicants may constitute from about 5 to 95 per cent by weight of the ultimate composition.

It is to be understood that either component may be employed in excess of the indicated preferred proportion. In such a composition the excess of either parasiticide toxicant in no way detracts from the improved results obtainable with the basic synergistic mixture.

4'-chlorophenyl 4-chlorobenzene sulfonate is a white crystalline solid melting at 81°–83° C., and having the following formula:

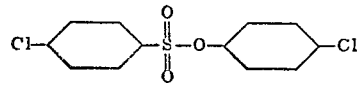

The following examples illustrate the invention but are not to be construed as limiting the same:

*Example 1*

A parasiticidal composition was prepared in the form of a wettable powder by grinding 50 parts by weight of 4'-chlorophenyl 4-chlorobenzene sulfonate, 1 part of Nacconol NR, 2 parts of a compounded substituted benzoic alkyl sulfonic acid (Daxad No. 27), and 47 parts of fuller's earth. This product is hereinafter referred to as "concentrate A." In a further operation, 50 parts by weight of tetraethyl pyrophosphate and 10 parts of Triton X100 were dispersed in 40 parts of xylene to produce a liquid concentrate hereinafter referred to as "concentrate B."

The respective concentrates were dispersed in water to prepare spray compositions having the following cocnentations of toxicants per 100 gallons:

No. 1. 2 pounds of 4'-chlorophenyl 4-chlorobenzene sulfonate.

No. 2. 1 pound of tetraethyl pyrophosphate.

No. 3. 2 pounds of 4'-chlorophenyl 4-chlorobenzene sulfonate and 1 pound of tetraethyl pyrophosphate.

No. 4. 1 pound of 4'-chlorophenyl 4-chlorobenzene sulfonate and ½ pound of tetraethyl pyrophosphate.

The four spray compositions were employed for the control of southern army worm on mature cranberry bean plants. In such operations, the bean foliage was wet with the indicated composition, the leaf surfaces allowed to dry, and the plants then infested with a known number of insect larvae. 72 hours following infestation, the bean plants were examined to ascertain the degree of control of southern army worm, and the following situation, expressed in per cent kill, was found to exist:

| Composition: | Per cent kill |
|---|---|
| No. 1 | 0 |
| No. 2 | 12 |
| No. 3 | 100 |
| No. 4 | 31 |

*Example 2*

A similar set of spray compositions was prepared from concentrates A and B by dispersing them in water in the following concentrations per 100 gallons:

No. 1. 2 pounds of 4'-chlorophenyl 4-chlorobenzene sulfonate.

No. 2. 1/16 pound of tetraethyl pyrophosphate.

No. 3. 2 pounds of 4'-chlorophenyl 4-chlorobenzene sulfonate and 1/16 pound of tetraethyl pyrophosphate.

No. 4. 1 pound of 4'-chlorophenyl 4-chlorobenzene sulfonate and 1/32 pound of tetraethyl pyrophosphate.

The spray compositions were applied to stands of mature cranberry bean plants which were infested with the adult stage of the two-spotted spider mite. At the end of 72 hours the bean plants were examined, and the following percentage kills observed:

| Composition: | Per cent kill |
|---|---|
| No. 1 | 26 |
| No. 2 | 95 |
| No. 3 | 100 |
| No. 4 | 100 |

*Example 3*

40 parts by weight of 4'-chlorophenyl 4-chlorobenzene sulfonate, 56.5 parts of fuller's earth, 2 parts of Daxad No. 27, and 1.5 parts of Nacconol NR were mixed and ground together to prepare a wettable powder hereinafter identified as "concentrate C."

Concentrate C and a commercial tetraethyl pyrophosphate concentrate were dispersed in water to produce a spray composition. The tetraethyl pyrophosphate concentrate was a wettable liquid containing 20 parts by weight of toxicant and 80 parts of inerts. Concentrate A and the tetraethyl pyrophosphate concentrate were employed in the amount of 10 ounces and 4 ounces, respectively, per 100 gallons of spray mixture.

The spray composition was applied on August 9 to apple trees of the Northern Spy variety. The trees were heavily infested with both the two-spotted spider mite and the European red mite, and located immediately adjacent to unsprayed check plots which provided a continuous source of reinfestation. The application was accomplished with conventional spray rig and in such dosage as to provide appreciable run-off from all tree surfaces. Seventeen days after application, the foliage of the trees was subjected to randomized sampling, and the individual leaves examined to determine the existent mite population. An average population of only 75 mites per 50 leaves was observed. In the check trees there was found an average population of 1112 mites per 50 leaves.

In a similar operation simultaneously carried out with the above application, an aqueous spray composition containing 10 ounces of concentrate C per 100 gallons of spray was applied to Spy apple trees. After seventeen days, randomized sampling and examination of leaves indicated an average mite population of 280 mites per 50 leaves.

A further determination was carried out in which the tetraethyl pyrophosphate concentrate was dispersed in water to prepare a spray composition containing 4 ounces of the concentrate per 100 gallons of spray. This composition was applied in the above described manner to Spy apple trees. Seventeen days following the application, the foliage of the trees was found to have an average infestation of 599 mites per 50 leaves.

No foliage injury resulted from the application of the mixture of toxicants. The trees treated therewith remained lush and green throughout the growing season, and were not subject to the leaf and fruit drop from mite attack which characterized the trees in the check plots.

I claim:

1. A composition for the control of mite and insect pests comprising as active toxic ingredients (1) tetraethyl pyrophosphate and (2) 4'-chlorophenyl 4-chlorobenzene sulfonate, the active toxic ingredients in such composition being mutually activating.

2. A composition for the control of mite and insect pests comprising as active toxic ingredients from 0.3 to 20 parts by weight of tetraethyl pyrophosphate for each 10 parts of 4'-chlorophenyl 4-chlorobenzene sulfonate, the active toxic ingredients in such composition being mutually activating.

3. A composition for the control of mite and insect pests comprising a carrier and dispersed therein as active toxic ingredients from 0.3 to 20 parts by weight of tetraethyl pyrophosphate for each 10 parts of 4'-chlorophenyl 4-chlorobenzene sulfonate, the active toxic ingredients in such composition being mutually activating.

4. A spray composition for the control of mite and insect pests comprising an aqueous carrier and dispersed therein as active toxic ingredients from 0.3 to 20 parts by weight of tetraethyl pyrophosphate for each 10 parts of the 4-chlorophenyl ester of 4-chlorobenzene sulfonic acid, the active toxic ingredients in such composition being mutually activating and being present in the amount of at least 0.03 pound of tetraethyl pyrophosphate and 0.1 pound of the 4-chlorophenyl ester of 4-chlorobenzene sulfonic acid per 100 gallons of spray.

EUGENE E. KENAGA.

REFERENCES CITED

The following references are of record in the file of this patent:

UNITED STATES PATENTS

| Number | Name | Date |
| --- | --- | --- |
| 2,148,928 | Meuron | Feb. 28, 1939 |

OTHER REFERENCES

Metcalf, "Acaricidal Properties of Organic Compounds Related to DDT," J. Econ. Ent., vol. 41, No. 6, December 1948, pages 875–882.

Hoffman, "Hexaethyl Tetraphosphate and Tetraethyl Pyrophosphate as Aerosols Against the Two-Spotted Spider Mite," J. Econ. Ent., vol. 41, No. 3, June 1948, pages 356–362.

Ludvik, "Toxicity of Certain Esters of Phosphorus Acids to Aphids," J. Econ. Ent., vol. 40, No. 1, February 1947, pages 97–100.

Lauger, "Über . . . toxische Wirkung von . . . synthetischen insektentötenden Stoffen," Helv. Chimica Acta, June 15, 1944, pages 892–908.